(12) United States Patent
Swetzig

(10) Patent No.: US 6,481,373 B2
(45) Date of Patent: Nov. 19, 2002

(54) PROGRAMMABLE HAY-FORAGE FEEDER

(76) Inventor: DeAnna K. Swetzig, P.O. Box 96, Windsor, CO (US) 80550

( * ) Notice: Subject to any disclaimer, the term of this patent is extended or adjusted under 35 U.S.C. 154(b) by 0 days.

(21) Appl. No.: 09/745,950

(22) Filed: Dec. 23, 2000

(65) Prior Publication Data

US 2001/0029897 A1 Oct. 18, 2001

Related U.S. Application Data

(60) Provisional application No. 60/173,580, filed on Dec. 29, 1999.

(51) Int. Cl.⁷ .................................................. A01K 5/02
(52) U.S. Cl. ..................................... 119/51.11; 119/57.1
(58) Field of Search ........................ 119/51.11, 58, 119/60, 57.1, 51.03, 57.91

(56) References Cited

U.S. PATENT DOCUMENTS

| 3,229,665 | A | * | 1/1966 | Baltz .......................... 119/57.1 |
| 4,656,969 | A | * | 4/1987 | Rapp et al. ............... 119/51.11 |
| 4,949,675 | A | * | 8/1990 | Parks ....................... 119/51.11 |
| 5,099,755 | A | * | 3/1992 | Montano et al. ............... 83/404 |
| 5,205,496 | A | * | 4/1993 | O'Donnell et al. ...... 241/152.2 |
| 5,368,238 | A | * | 11/1994 | Bergkamp et al. .......... 241/223 |
| 5,899,169 | A | * | 5/1999 | Jenson ..................... 119/51.11 |
| 5,908,007 | A | * | 6/1999 | Duin ....................... 119/51.11 |
| 6,263,833 | B1 | * | 7/2001 | Runyan et al. .......... 119/51.11 |

* cited by examiner

Primary Examiner—Charles T. Jordan
Assistant Examiner—John W. Zerr

(57) ABSTRACT

The Programmable Hay-Forage Feeder takes a whole bale, (round, rectangular, Square), optionally two or more bales, of grass, alfalfa, or grass-alfalfa mix hay or forage and works similar to a hay baler in reverse. It will break apart and release small quantities of hay from the bale and automatically dispense the forage into a feed tub for a horse or animal to consume over time, based on a programmed schedule. The hay/forage is placed into the bale chute, which is raised by a winch. A motor and programmable controller control the activity of the forage being raked and released in the gravity fed bale chute into the feeder tub. The controller has a stop, start, pause, and reset function to enable the unit to stop when not in use. This allows for a new, mechanized, time-released method of feeding hay/forage to horses and giving animals a more natural feeding alternative.

13 Claims, 7 Drawing Sheets

PROGRAMMABLE HAY-FORAGE FEEDER

CROSS REFERENCE TO RELATED APPLICATION:

This application is based upon and claims the benefit of Provisional Patent Application Serial No. 60/173,580 filed Dec. 29, 1999.

FIELD OF INVENTION

This invention relates to the hay and forage feeders to feed horses and animals. More particularly it relates to animal feeders which dispense feed, automatically at defined, designated times.

BACKGROUND OF THE INVENTION

The Programmable Hay-Forage Feeder enables the horse and livestock owner to feed animals even when unable to be there at certain times. The Programmable Hay-Forage Feeder is a whole bale feeder. The closest prior art for this type of problem is a Round Hay Animal Feeder, U.S. Pat. No. 5,908,007, Rotating Livestock Hay/Feeder dated Jun. 1, 1999 from Robert Duin. This feeder takes a flake of hay at a time and then operates in a circular, round crank fashion. Using a flake of hay at a time, the Rotating Livestock Hay/Feeder must be loaded with individual flakes of hay frequently.

The Programmable Hay-Forage Feeder of this invention overcomes the need to 1). Break the hay into individual flakes, and 2). Load hay frequently by using a WHOLE bale at a time. There are different embodiments of the Hay-Forage Feeder to allow for small single bales to full one ton bales at a time of all types of hay, baled feed and forage. The Programmable Hay-Forage Feeder takes the bale, and rakes through the bale to release small, individual portions of the hay during prescribed times, releasing periodically throughout the day. This definitely overcomes the disadvantage the "Rotating Livestock Hay/Feeder" has, as it does not require the frequent manual loading of the hay, and it does not require flaking and manually tearing the hay bale apart, thereby reducing potential hay loss and droppage when loading. Additionally, by utilizing an entire bale or two at a time, the Programmable Hay-Forage Feeder needs to be loaded only when the full bale is used, which can be a few days, versus two or three times a day as with other options. The Programmable Hay-Forage Feeder allows animals to have better digestion and processing of the hay-forage by feeding small amounts periodically, spread out throughout the day versus force feeding large amounts once or twice a day.

There has not heretofore been described a programmable hay or forage feeder having the features and advantages provided by the present invention.

SUMMARY OF THE INVENTION

The Programmable Hay-Forage Feeder of this invention, is a simple, reliable, automatic and controlled way to feed horses, livestock and animals throughout the day without physically being there to manually dispense the hay. This invention is focused on the animals, allowing them to eat small amounts periodically throughout the day. However, there are advantages to the human and horse or livestock owner including ease of schedule, meeting feeding deadlines and peace of mind knowing the animals are being fed even when the owner is stuck in a meeting late at work.

Additional objects and advantages of the present invention include:

Make it easy and simple to feed animals throughout the day without being there

Fill the hay-forage feeder once every 3–4 days (dependant on application), check them when possible Helps reduce animal boredom Enables easier digestion for horses and animals by distributing small quantities, more frequent hay feedings several times during the day Allow for horse and animal owners to know their horse is being fed when they are unable to meet prescribed feeding times Give the horses/animals activity and something to do during long days Great alternative to force feeding large quantities twice a day Easily accommodates rectangular, square, or round hay/forage bales Other features and advantages will be apparent from the following detailed description and the accompanying drawings.

BRIEF DESCRIPTION OF THE DRAWINGS

The Programmable Hay-Forage Feeder is an invention that takes a whole bale (or optionally two or more bales), of grass, alfalfa, or grass-alfalfa mix hay or other forage and works similar to a hay baler in reverse. It will break apart and release small quantities of hay from the bale and dispense it into a feed tub for a horse or animal to consume over time, based on a programmable schedule.

DETAILED DESCRIPTION OF THE INVENTION

Figure 1:
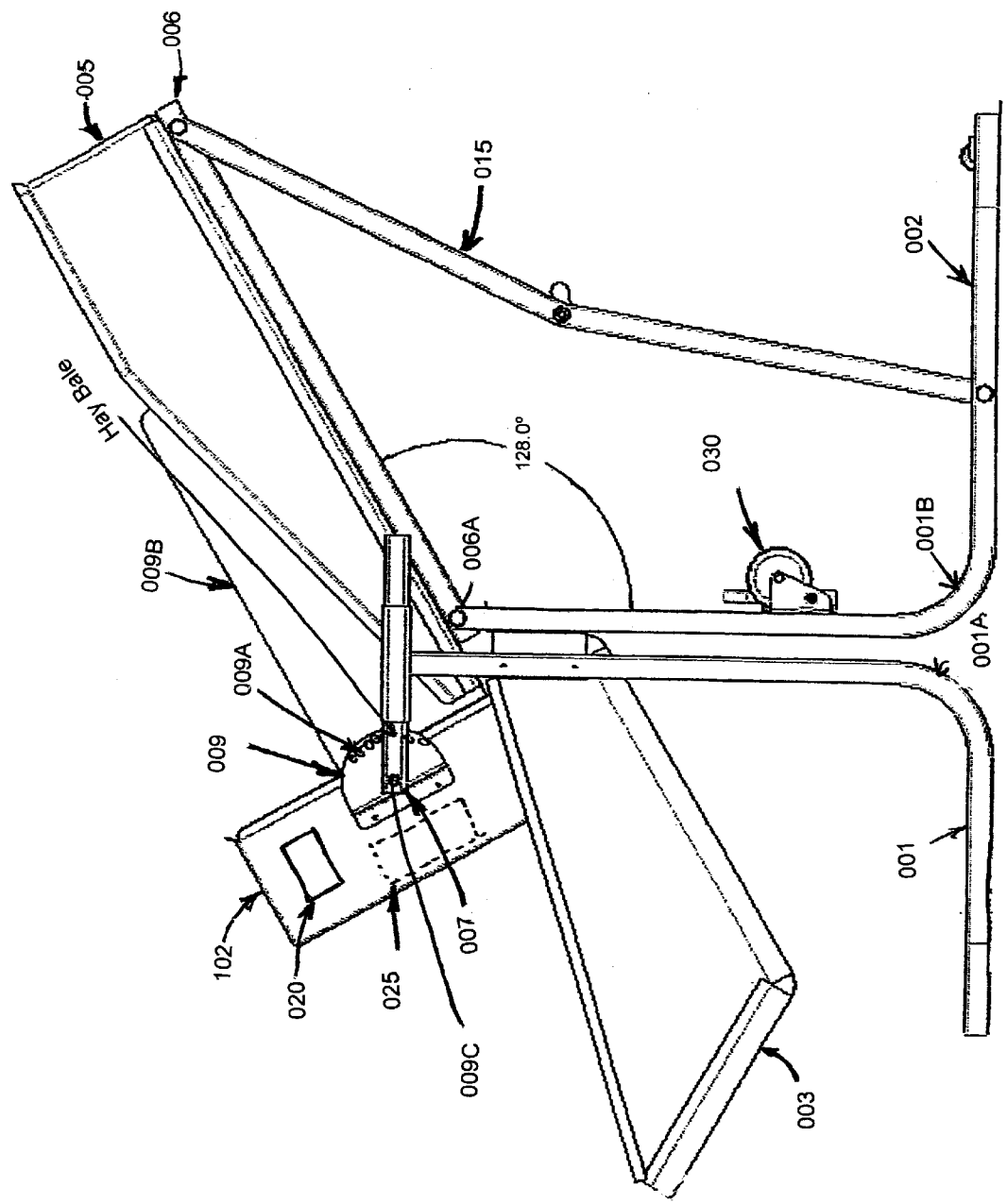
FIG. 1 shows a side elevational view of one embodiment of a bale feeder of this invention.

FIG. 1 shows a side elevational view of one embodiment of a bale feeder of this invention. Item 001 is a support frame for dispenser assembly. Item 002 is the support frame for the bale. There are two separate frames to allow for installation on a metal corral panel, or on a side of a barn, with one frame section inside the area with the animal and one frame section exterior to the corral panel, (Items 001A & 001B). This enables easy installation as well as separation from the hay bale-slide, and forage dispensing unit, so this remains away from the horse or animals being fed, yet accessible for the owners to load and feed exterior to the coral or barn. Item 003 is the hay/forage feed tub, which is equivalent to the feed trough. Item 102 is the dispenser assembly. Item 020 is the controller. Item 025 is the motor and gear reducer box that operates the dispenser function. The controller is commercially available and is akin to a standard Rain Bird electronic programmable timing device in which multiple programs can be established to facilitate multiple feeding cycles. This controller combined with the motor, gear reducer assembly gives this invention a preferred feature for stripping and dispensing hay and forage at designated times.

Item 005 is the bale-slide that is a chute support for the bale and it may be of any desired length. Item 006 is the frame component that reinforces and supports the bale-slide. The forward end of the bale chute is pivotably supported on frame section 002 with pin 006A. Item 007 is the pivot arm that allows the dispenser to be adjusted to the bale (specific to type of hay or forage) required for proper hay stripping. Item 009 is a pivot plate which allow adjustments for the angle of the dispenser and where it resides relative to the forward end of the bale in the chute. The angle will facilitate stripping bales of hay and forage for different types of pack density and works in conjunction with Item 007 which is a support arm carried by frame section 001.

The pivot plate 009 includes a plurality of spaced openings 009A on its periphery. The plate also includes a pivot pin 009C, which enables the place 009 (an thus dispenser 102) to pivot relative to support arm 007. Pin 009C can be inserted through an aperture in arm 007 and a desired opening 009B in plate 009. By pivoting the lower end of the dispenser 102 toward the forward end of the bale, the dispenser mechanism is more aggressive in stripping or loosening hay from the bale.

Item 015 is a link that holds and maintains the elevation of the bale-slide and facilitates raising the bale easily through the implementation of a simple winch. Item 030 shows the hand winch assembly. The hay bale is represented by the label "hay bale". Once the winch raises the bale support chute up to its proper position and elevation, gravity will enable the hay to follow the bale-slide down the chute to the hay stripping and dispenser unit, 102. The winch is a common winch, which allows the bale-slide to be lowered for easily loading of the hay bale. This is important to easily facilitate moving the hay from the feed source, loader, wagon, wheelbarrow, etc. to the forage feeder. Once the bale is placed on the bale-slide, the winch can then be cranked to raise the bale-slide up into the gravity flow feed position.

Figure 2:
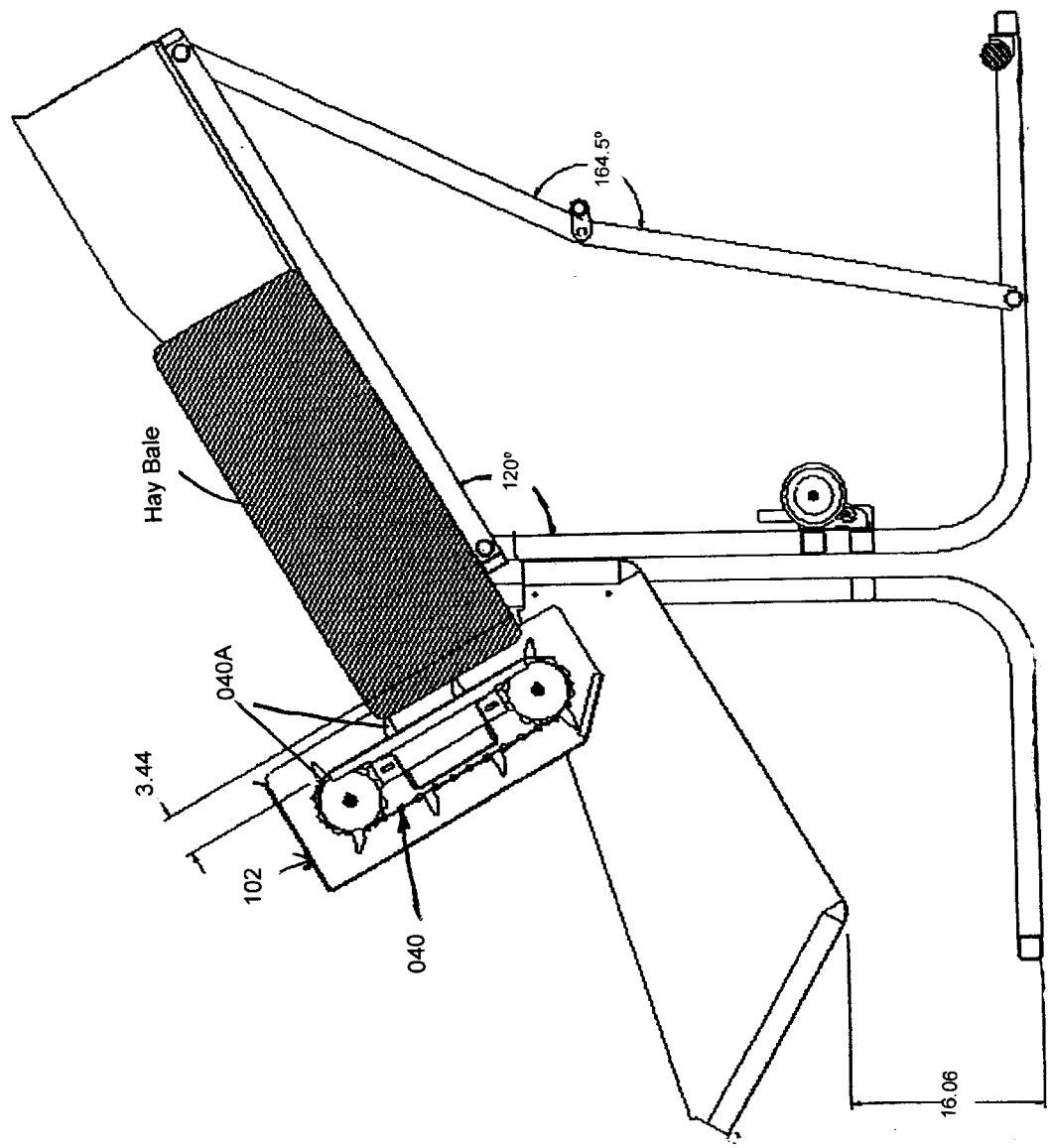
FIG. 2 shows a side elevational, partially cutaway view of the embodiment shown in FIG. 1.

FIG. 2 shows a sectional view of the bale and shows the teeth or claws 040A on the stripping endless chain (Item 040), that rakes and claws particles of hay off of the forward end of the bale. FIG. 2 demonstrates how the bale is oriented to maintain its shape and stay in tact after the baling twine is cut and removed. The stripping chain is an application of standard agricultural components.

Figure 3:
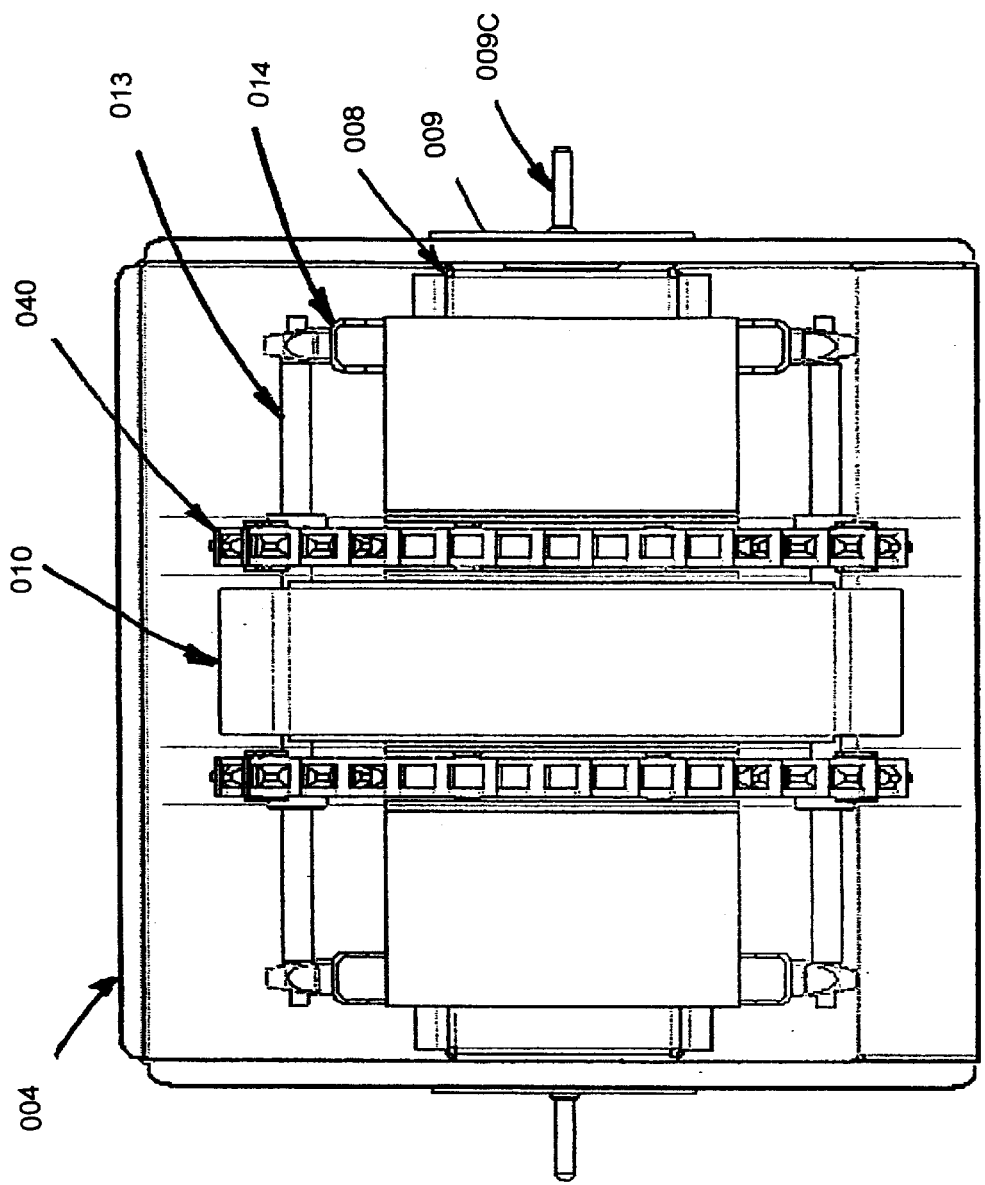
FIG. 3 is a bale-side view of the hay/forage dispenser mechanism used in the embodiment of FIG. 1.

FIG. 3 is a frontal view of the bale side view of the hay/forage dispenser mechanism, 102. This figure shows the stripping chains, (Item 040) in more detail, the shafts, bearings and Item 008 the dispenser frame. It shows item 010 the stripper plate and item 013 the dispenser shafts. Item 014 are the bearing mounts, Item 004 is the overall cover, the dispenser shield. Item 009C are the dispenser pivots as seen in FIG. 1. The chains are powered by motor 025 in conjunction with the controller 020.

Figure 4:
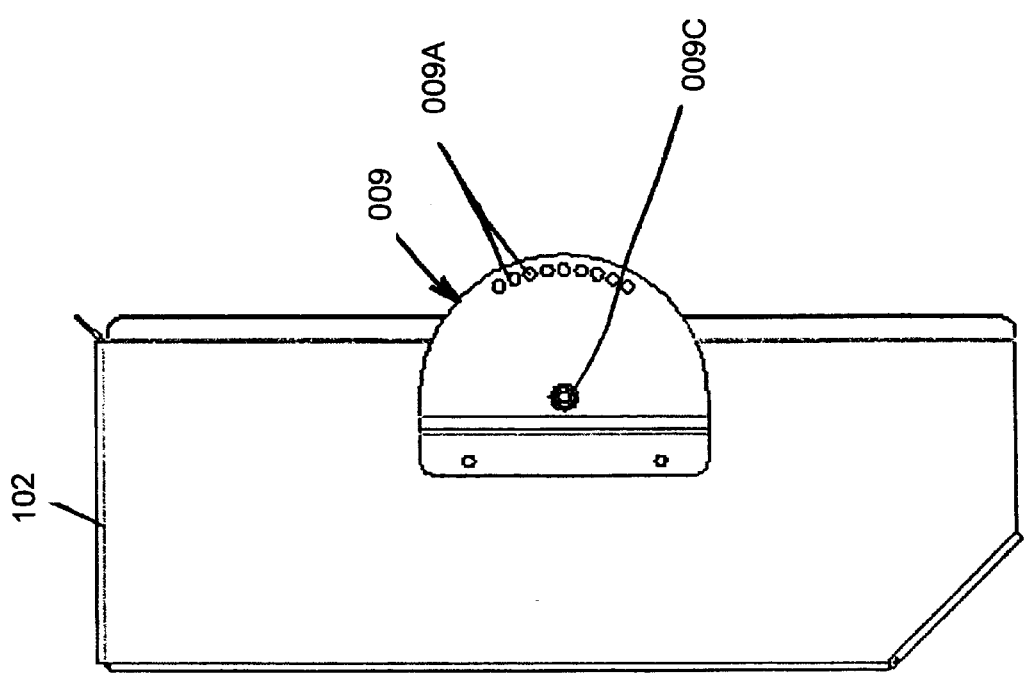
FIG. 4 shows a side view of FIG. 3 hay/forage dispenser mechanism.

FIG. 4 is a side view of the dispenser mechanism showing the dispenser pivot with multiple adjustment angles to allow for the different pack densities of the hay and forage.

Figure 5:
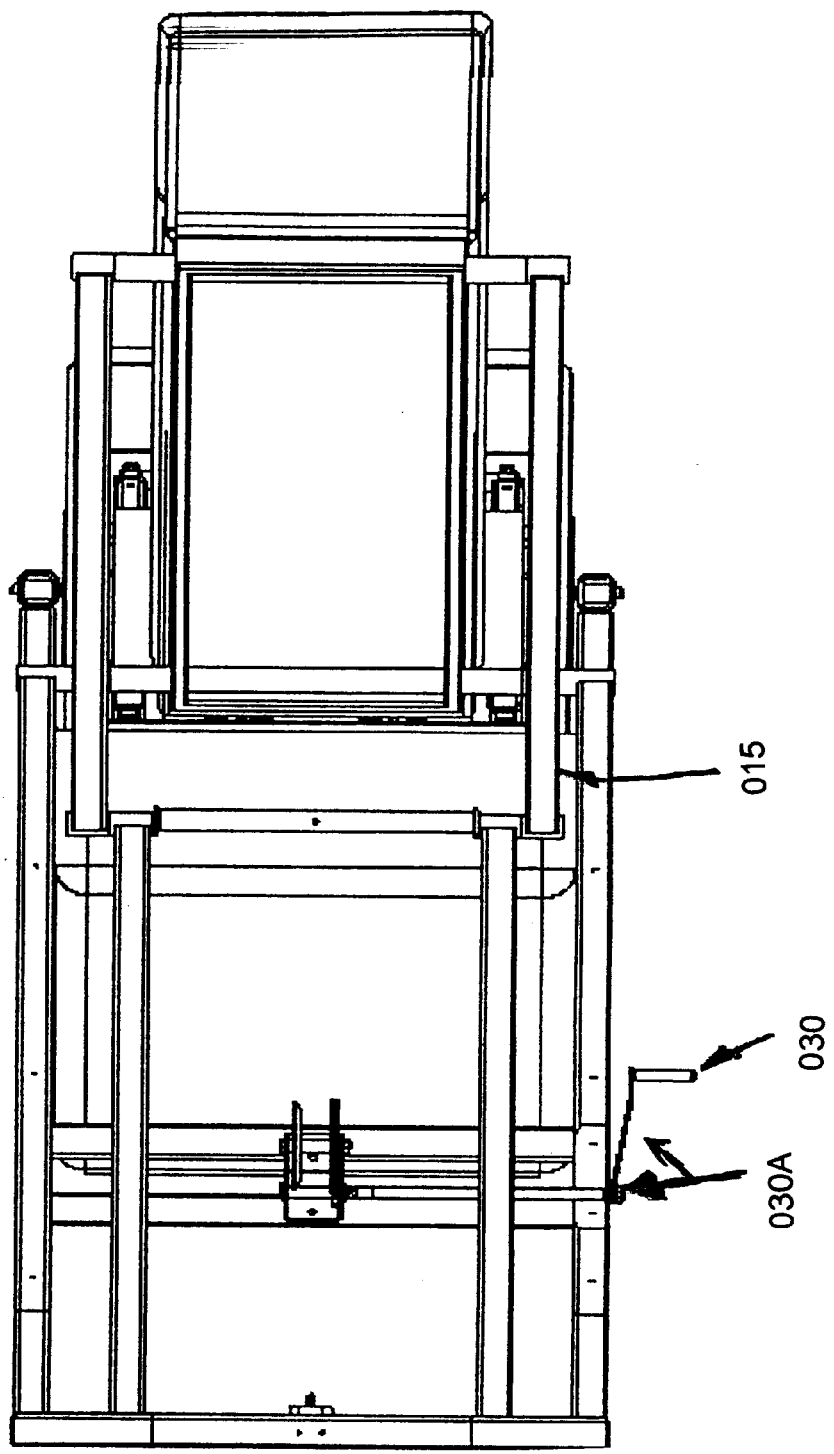
FIG. 5 shows a view of the overall assembly of the hay bale support, a rear elevation view of FIG. 1.

FIG. 5 is an end view of the entire assembly and shows how the support links support the bale-slide assemble. FIG. 5 also shows where the winch (Item 030) crank handle can be extended to make it more accessible, 030A

Figure 6:
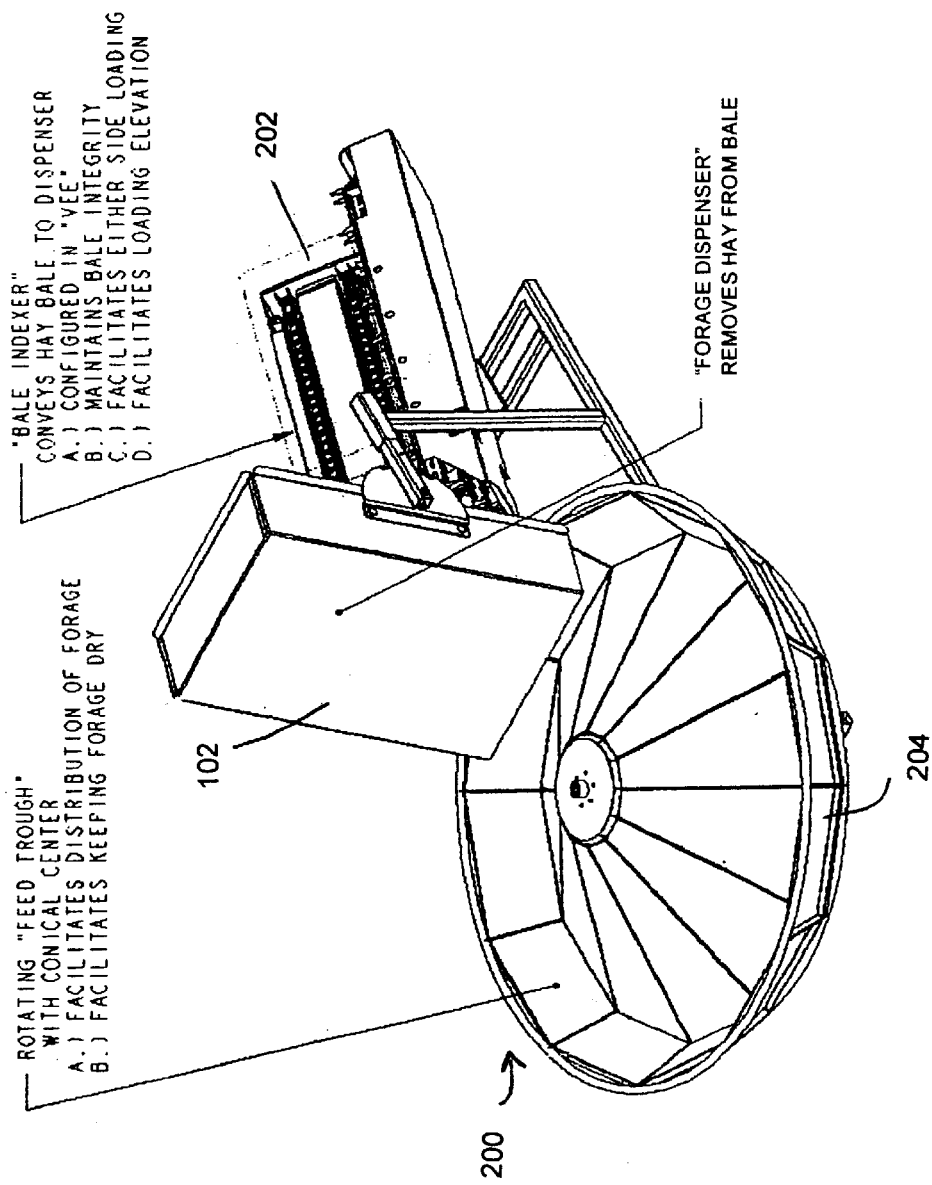
FIG. 6 shows an alternative embodiment, where the bale is mechanically fed into the dispenser and the hay then drops into a rotating trough to feed multiple animals.

FIG. 6 shows an embodiment, 200 of this invention which can accommodate multiple bales of hay with automatic bale transport for feeding multiple animals. The transport or bale indexer, 202 is configured in a "V" to maintain bale integrity when the baling twine is cut and released from the bale, or when different shapes and types of bales are used, (round, square, rectangular, etc.). The rotating feed trough, 204 moves in a circular movement about a vertical axis to distribute the hay over a larger feeding area.

Figure 7:
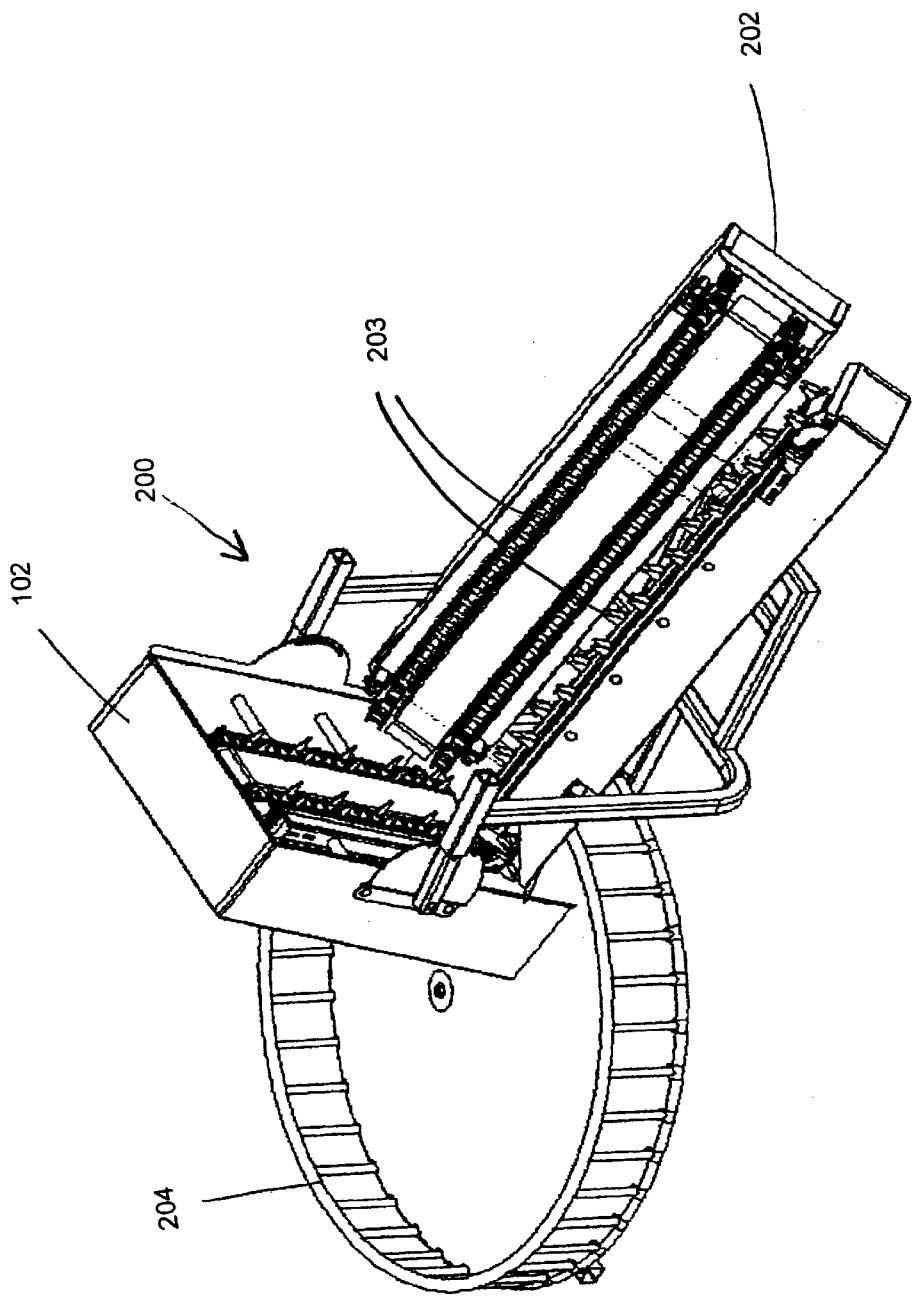
FIG. 7 shows a rear perspective of the embodiment in FIG. 6.

FIG. 7 is a perspective of FIG. 6, showing how the "V" shaped conveyor, 202 is oriented to move the hay/forage into the dispenser. It also demonstrates the embodiment for more than one bale of hay. It also shows how easy it is to load the hay into the hay transport or bale indexer. The conveyor includes endless chains 203 with teeth or claws to engage a bale and move it toward the dispensing mechanism 102. Chains 203 are powered by the same motor, which powers the dispensing mechanism 102. This version of the product is also useful for dispensing round bales, as well as square bales.

What is claimed is:

1. Apparatus for dispensing hay or forage from a bale at defined times, the apparatus comprising:
   (a) an upright frame member,
   (b) chute means supported by said frame member for receiving and supporting said bale to be dispensed; wherein said chute means includes forward and reward ends; wherein said forward end is pivotably connected to said frame member;
   (c) powered dispensing means supported by said frame member in close proximity to said forward end of said chute means for removing a portion of said bale;
   (d) feed receiving trough positioned below said dispensing means for receiving said portion of said bale; and
   (e) controller means for actuating said dispensing means at a defined time.

2. Apparatus in accordance with claim 1, further comprising lift means for selectively raising and lowering said rearward end of said chute means.

3. Apparatus in accordance with claim 1, wherein said dispensing means comprises at least one endless chain including claw members forengaging said bale at said forward end of said chute means to remove said portion.

4. Apparatus in accordance with claim 3, further comprising upper and lower rotatable sprockets carried by said dispensing means for powering said endless chain.

5. Apparatus in accordance with claim 3, wherein said dispensing means is pivotably mounted on said frame member, and further comprising locking means for selectively locking said dispensing means in a fixed position.

6. Apparatus in accordance with claim 2, wherein said rearward end of said chute means is supported at a position higher than said forward end such that said chute means slopes downwardly from said rearward end to said forward end.

7. Apparatus in accordance with claim 1, wherein said chute means further comprises powered conveyor means for moving said bale in said chute means toward said forward end.

8. Apparatus in accordance with claim 1, wherein said feed receiving trough comprises a tub.

9. Apparatus in accordance with claim 8, wherein said tub is rotatable about a vertical axis.

10. Apparatus for dispensing hay or forage from a bale at defined times, the apparatus comprising:
   (a) an upright frame member;
   (b) chute means supported by said frame member for receiving and supporting said bale to be dispensed; wherein said chute means includes forward and rearward ends; wherein said forward end is pivotably supported on said frame member;

(c) powered dispensing means supported by said frame member in close proximity to said forward end of said chute means for removing a portion of said bale;

(d) feed receiving trough positioned below said dispensing means for receiving said portion of said bale; and (e) controller means for actuating said dispensing means at a defined time.

11. Apparatus in accordance with claim 10, wherein said dispensing means further includes at least one endless chain including claw members for engaging said bale at said forward end of said chute means to remove said portion.

12. Apparatus in accordance with claim 11, wherein said dispensing means is adjustably mounted on said frame member to enable said dispensing means to be moved toward or away from said forward end of said chute means.

13. Apparatus in accordance with claim 10, wherein said frame member comprises first and second frame sections which are connected together and which define a slot therebetween.

* * * * *